United States Patent [19]
Inoue

[11] Patent Number: 5,352,895
[45] Date of Patent: Oct. 4, 1994

[54] PYROELECTRIC DEVICE

[75] Inventor: Masao Inoue, Tokyo, Japan

[73] Assignee: Nohmi Bosai Ltd., Tokyo, Japan

[21] Appl. No.: 18,530

[22] Filed: Feb. 17, 1993

[30] Foreign Application Priority Data

Feb. 19, 1992 [JP] Japan .................................. 4-080536
May 8, 1992 [JP] Japan .................................. 4-141925

[51] Int. Cl.$^5$ ............................................. G01J 5/10
[52] U.S. Cl. .................................................. 250/338.3
[58] Field of Search ...................................... 250/338.3

[56] References Cited

U.S. PATENT DOCUMENTS

| | | | |
|---|---|---|---|
| 3,769,096 | 10/1973 | Ashkin et al. | 136/213 |
| 4,258,259 | 3/1981 | Obara et al. | 250/338.3 |
| 4,542,294 | 9/1985 | Tamura et al. | 250/338.3 |
| 4,626,687 | 12/1986 | Nara et al. | 250/338.3 |
| 4,851,682 | 7/1989 | Moriyama et al. | 250/338.3 |

FOREIGN PATENT DOCUMENTS 0145457 12/1984 European Pat. Off. .
0158093 2/1985 European Pat. Off. .
0370426 11/1989 European Pat. Off. .

Primary Examiner—Constantine Hannaher
Attorney, Agent, or Firm—Wenderoth, Lind & Ponack

[57] ABSTRACT

A pyroelectric device includes a pyroelectric member for detecting infrared radiation, a transistor whose gate electrode is connected to one of the terminals of the pyroelectric member, a drain terminal connected to a drain electrode of the transistor, a source terminal connected to a source electrode of the transistor, a grounding terminal connected to the other terminal of the pyroelectric member, and a gate resistor connected between the terminals of the pyroelectric member. The gate resistor used in a pyroelectric device for a fire detection has a resistance ranging from 5 to 50 gigaohms, and the gate resistor used in a pyroelectric device for an intrusion detection has a resistance equal to or less than 30 gigaohms.

4 Claims, 5 Drawing Sheets

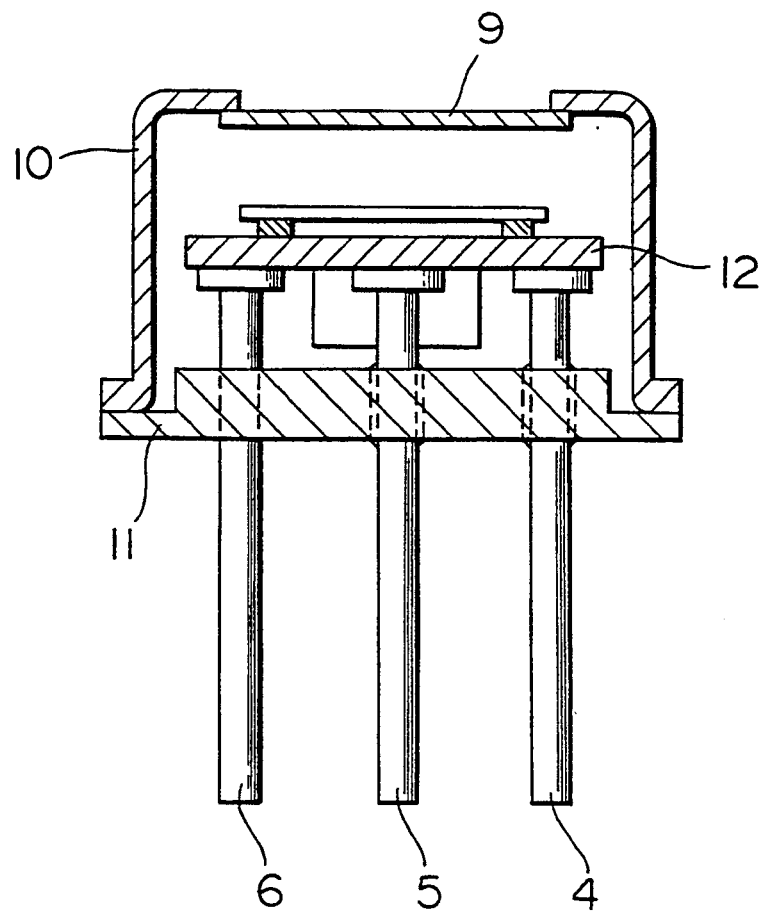

PYROELECTRIC DEVICE

BACKGROUND OF THE INVENTION

1. Field of the Invention

The present invention relates to a pyroelectric device for detecting infrared radiation which is for use in a flame sensor for fire detection or in an intrusion detector used for prevention of crimes.

2. Description of the Related Art

FIG. 6 shows the structure of a conventional pyroelectric device. A casing includes a metal can 10 and a stem 11 welded to the can 10. The metal can 10 is hermetically sealed by a filter 9 made of silicon. Three pins 4, 5 and 6 respectively constituting a drain terminal, a source terminal and a grounding terminal pass through the stem 11. A printed-circuit board 12 is placed on and fixed to the upper end portions of the pins 4, 5 and 6 by soldering or the like to construct an electric circuit portion.

In the electric circuit of the pyroelectric device, the source electrode of a field-effect transistor (hereinafter referred to as an FET), serving as a preamplifier, is connected to one of electrodes of the pyroelectric member. In order to control the frequency characteristics of the detection sensitivity, a gate resistor is parallel-connected to the pyroelectric member. The electric time constant of the gate resistor determines the cut-off frequency in the low frequency band. A gate resistor having a high resistance of 100 to 200 gigaohms is used, and especially for detection of a human body the pyroelectric device itself has a wider frequency characteristic.

If a gate resistor having a resistance of, for example, 100 gigaohms is used, the sensitivity of the pyroelectric device with a response frequency characteristics curve of arch-form having a peak at about 0.5 Hz is obtained. The frequency characteristics of the infrared radiation from a human body which are required for an intrusion detector are peaked at about 0.1 Hz. The frequency characteristics of a flame required for a fire alarm sensor are peaked at about 8 Hz. Thus, if the above-described response frequency characteristics peaked at about 0.5 Hz are employed for detection of a flame, the peak of the output sensitivity cannot be obtained in the desired frequency band.

Furthermore, where the ambient temperature of the pyroelectric device rapidly changes, the pyroelectric device may not be able to produce an output. That is, when the resistance of the gate resistor is high, the voltage applied to the pyroelectric member is low. Therefore, if the ambient temperature drops at a rate of, for example, 1.4° C./min, a nonsignal output state (a pinch-off state) results. Changes in the ambient temperature may depend on the installation site of the sensor or detector. A detector which is in a nonsignal state causes a serious problem.

SUMMARY OF THE INVENTION

Accordingly, an object of the present invention is to provide a pyroelectric device having frequency characteristics suited for a fire alarm.

Another object of the present invention is to provide a pyroelectric device which is capable of stably detecting infrared radiation even when the ambient temperature changes.

In order to achieve the above objects, there is provided a pyroelectric device for a fire detection which comprises a pyroelectric member for detecting an infrared radiation, a transistor whose gate electrode is connected to one of terminals of the pyroelectric member, a drain terminal connected to a drain electrode of the transistor, a source terminal connected to a source electrode of the transistor, a grounding terminal connected to the other terminal of the pyroelectric member, and a gate resistor connected between the two terminals of the pyroelectric member, the gate resistor having a resistance of 5 to 50 gigaohms.

Another aspect of the present invention resides in a pyroelectric device for an intrusion detection which comprises a pyroelectric member for detecting an infrared radiation, a transistor whose gate electrode is connected to one of terminals of the pyroelectric member, a drain terminal connected to a drain electrode of the transistor, a source terminal connected to a source electrode of the transistor, a grounding terminal connected to the other terminal of the pyroelectric member, and a gate resistor connected between the two terminals of the pyroelectric member, the gate resistor having a resistance equal to or less than 30 gigaohms.

BRIEF DESCRIPTION OF THE DRAWINGS

FIG. 6 is a cross-sectional view of a generally employed pyroelectric device.

DETAILED DESCRIPTION OF THE PREFERRED EMBODIMENTS

Figure 1:
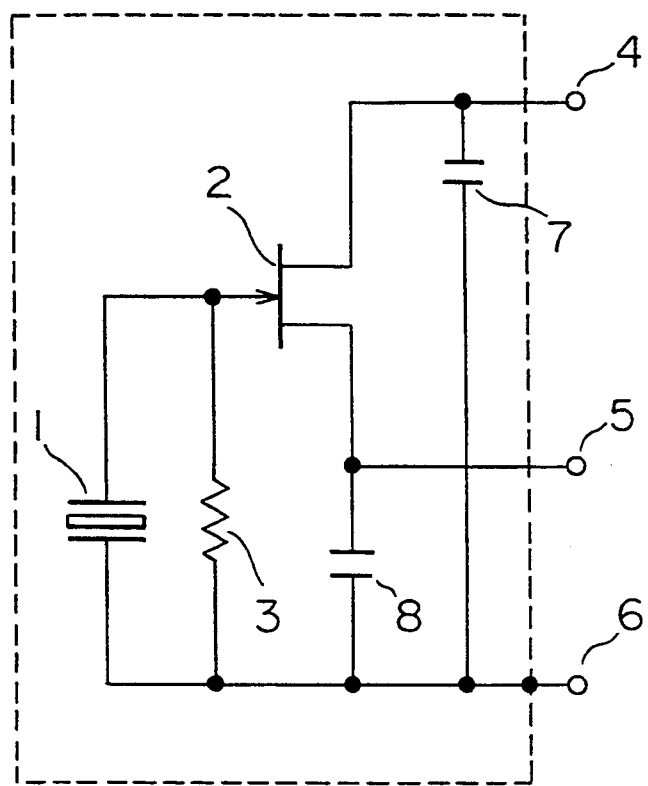
FIG. 1 is a circuit diagram of a circuit of a pyroelectric device showing a first embodiment of the present invention.

An embodiment of the present invention will now be described with reference to FIGS. 1 and 6. FIG. 1 is a circuit diagram of a pyroelectric device according to the present invention. FIG. 6 is a schematic cross-sectional view of the pyroelectric device. Since the structure shown in FIG. 6 is the same as that of the conventional device, a description thereof is omitted.

In FIG. 1, reference numeral 1 denotes a pyroelectric member made of PVDF or PZT; 2 denotes an FET whose gate electrode is connected to one of electrodes of the pyroelectric member 1; 3 denotes a gate resistor of FET 2 which is parallel-connected to the pyroelectric member 1; 4 denotes a drain terminal connected to a drain electrode of FET 2; 5 denotes a source terminal connected to a source electrode of FET 2; 6 denotes a grounding terminal connected to the other electrode of the pyroelectric member 1, the grounding terminal being also connected to the stem 11 which is in turn connected to both the can 10 and the filter 9 to provide a shielding of the entire circuit; 7 denotes a capacitor provided between the drain electrode of FET 2 and grounding line to stabilize a supplied voltage; and 8 denotes a capacitor provided between the source electrode of FET 2 and the grounding line to cut a high-frequency induced noise. Both capacitors 7 and 8 have a capacitance of about 10 pF, and do not affect the results of the experiments which will be described later. The provision of the capacitors 7 and 8 may be eliminated. The electric circuit portion made up of FET 2, the gate resistor 3 and so on is placed on the printed-circuit board 12 in the casing.

In the pyroelectric device arranged in the manner described above, as the intensity of infrared radiation received by the pyroelectric member 1 changes, the gate potential of FET 2 changes, generating a voltage to be detected between the source terminal 5 and the grounding terminal 6. This voltage to be detected is connected to an electric circuit (not shown) where it is amplified by an amplifying circuit, compared with a reference value by a discrimination circuit, and then output as, for example, a fire signal.

Figure 2:
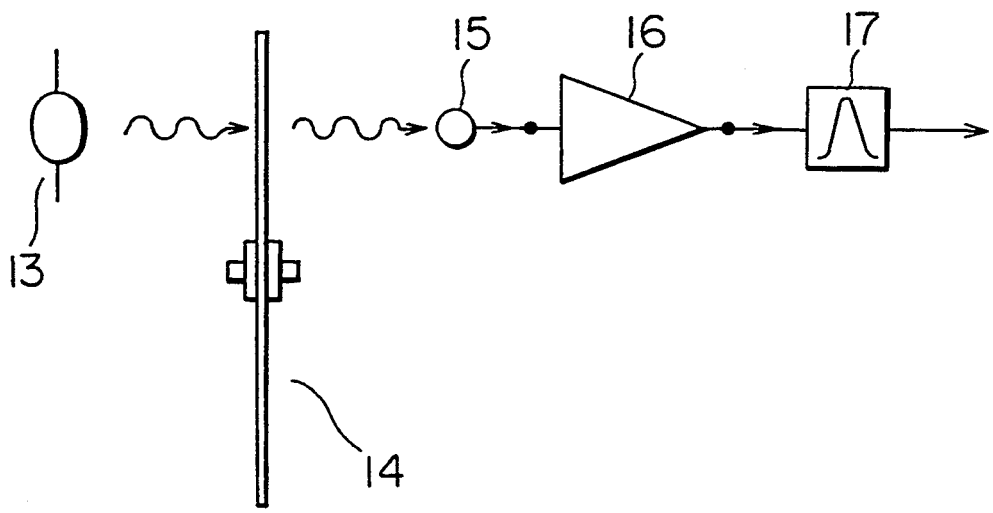
FIG. 2 illustrates a device for measuring the frequency characteristics of the pyroelectric device.

FIG. 2 shows the structure of a device for examining the frequency response characteristics of the pyroelectric device. Reference numeral 13 designates a light source for illuminating infrared radiation; 14 designates a rotary chopper which is rotatable with a fixed period to generate a desired frequency; 15 designates a pyroelectric device to be tested; 16 designates an AC coupled amplifier for electrically amplifying the output of the pyroelectric device 15; and 17 designates a bandpass filter used to take out only the output corresponding to the rotation frequency.

Figure 3:
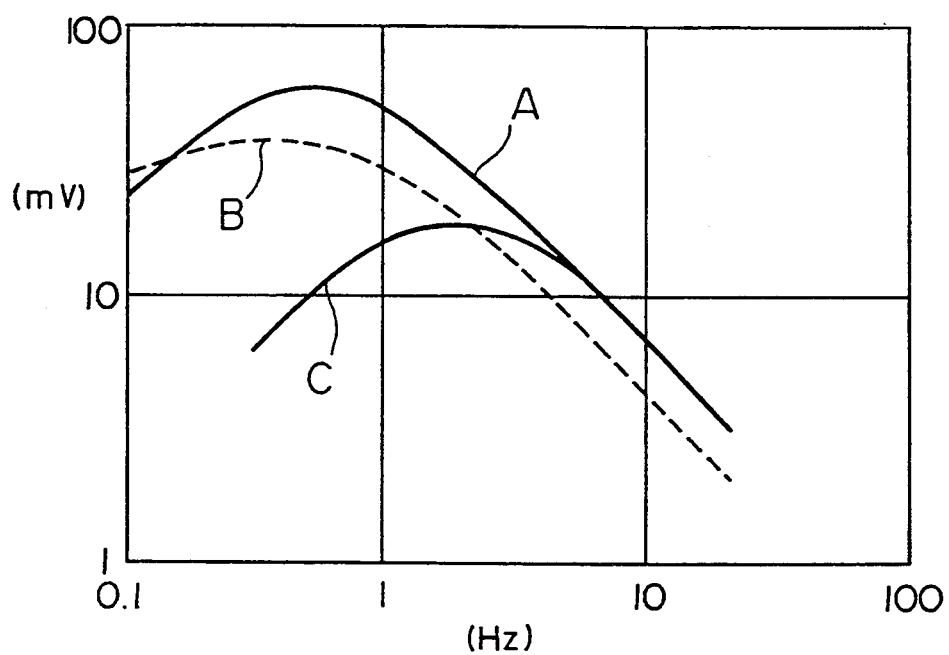
FIG. 3 is a graph showing the frequency characteristics of the pyroelectric device.

FIG. 3 shows the results of examination of the response frequency characteristics of the pyroelectric device by using the device of FIG. 2. The abscissa axis represents the frequency (Hz) generated by the rotary chopper 14. The coordinate axis represents the output sensitivity (mV) of the pyroelectric device 15. A curve A indicates the response frequency characteristics obtained when the pyroelectric member 1 is made of PVDF and the gate resistor 3 has a resistance of 100 gigaohms. A curve B indicates the response frequency characteristics obtained when the pyroelectric member 1 is made of PZT and the gate resistor 3 has a resistance of 100 gigaohms. When the resistance of the gate resistor 3 is 100 gigaohms, the output sensitivity is peaked at about 0.5 Hz independent of the material of the pyroelectric member 1. In that case, the pyroelectric member 1 still has a sufficient output sensitivity at about 8 Hz which is the peak of the frequency characteristics by a flame, and can thus be employed to detect infrared radiation emitted from both a flame and a human body.

A curve C shows the frequency characteristics obtained when a gate resistor 3 having a resistance of 10 gigaohms is used. In the case shown by curve C, the sensitivity of the low frequency range is lowered without reducing the sensitivity at about 8 Hz which is characteristic to a flame. A cut-off frequency, i.e., the peak value of the arch-form curve, fc is given by the following equation:

$$fc = 1/(2\pi \cdot c \cdot Rg)$$

where c is the sum of the capacitance of the pyroelectric member 1 and the input capacitance of FET 2, Rg is the resistance of the gate resistor 3, and $\pi$ is the ratio of a circumference of a circle to its diameter. In the above-described equation, as the resistance Rg is reduced, the cut-off frequency fc increases. Therefore, the low frequencies can be cut off by reducing the resistance Rg. Hence, the resistance of the gate resistor 3 may be reduced to 5 giga ohms. In that case, however, the output sensitivity of the pyroelectric element 1 slightly deteriorates, although it is peaked at about 8 Hz. Thus, a further reduction in the resistance deteriorates the sensitivity and shifts the peak. The above-described characteristics of the pyroelectric member 1 are associated with the electric properties of the pyroelectric member 1 and not affected by the material thereof.

The resistance of the gate resistor 3 also affects the results of a temperature cycling test. Temperature cycling test is a test conducted to determine whether the pyroelectric device can produce a normal detection signal after a temperature changing operation in which the temperature is changed cyclically from a high temperature to a low temperature at predetermined time intervals is repeated a few times.

Figure 4:
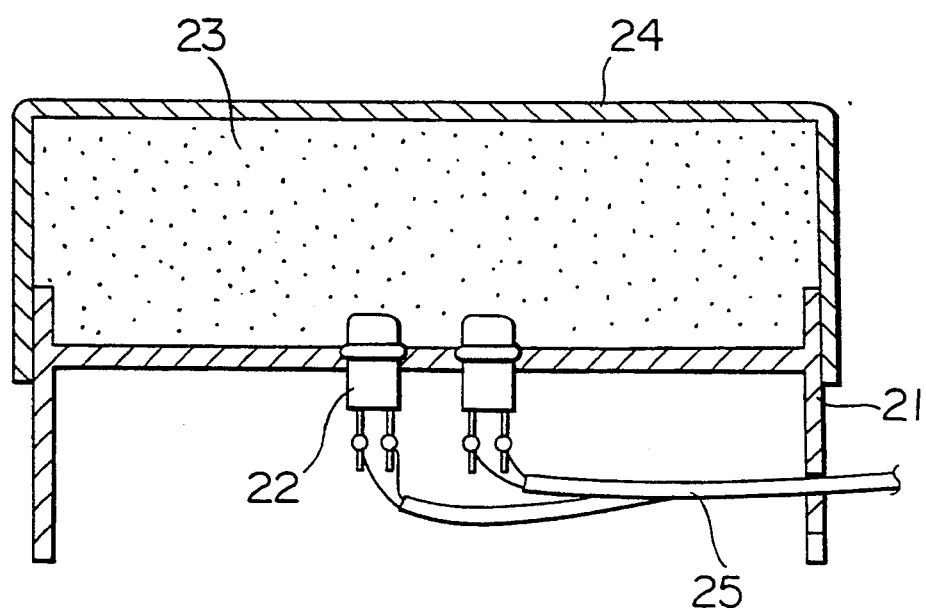
FIG. 4 illustrates a device used to perform a temperature cycling test on the pyroelectric device.

FIG. 4 shows a device used for the temperature cycling test. Mounting portions 22 are provided on a frame 21. A pyroelectric device to be tested is placed on each of the mounting portions 22. A heat insulating cap 24 packed with a heat insulating material 23 covers the side of the frame 21 which is located close to the light-receiving surface of the device. Signal lines 25 are soldered to the pins of the pyroelectric devices which protrude from the mounting portions 22 to take out signals. The entire device shown in FIG. 4 is set inside a temperature adjusting apparatus (not shown), such as a constant-temperature chamber.

Figure 5:
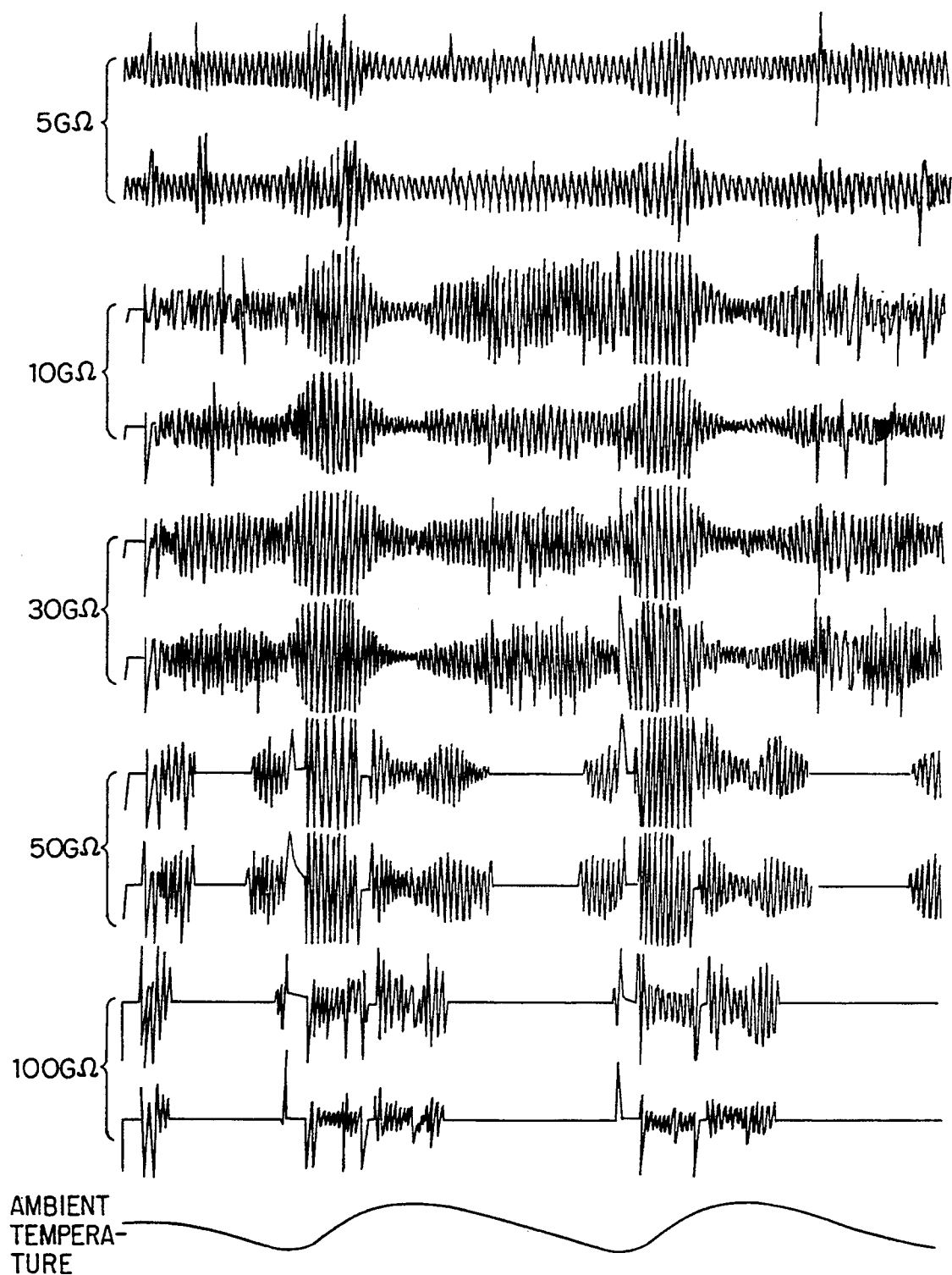
FIG. 5 shows the noise levels obtained when the pyroelectric device is subjected to the temperature cycling test.

FIG. 5 shows the noise levels obtained when the pyroelectric devices were subjected to the temperature cycling test which employed the device shown in FIG. 4. Pyroelectric devices in which the resistances of the gate resistor 3 were respectively 5 gigaohms, 10 gigaohms, 30 gigaohms, 50 gigaohms and 100 gigaohms were tested. Two pyroelectric devices were tested for each resistance. In the test, the ambient temperature was changed in the range from $-50°$ C. to $+50°$ C. at an increasing rate of about 3.7° C./min and at a decreasing rate of about 1.4° C./min.

As is clear from FIG. 5, when the gate resistor 3 had a resistance of 50 gigaohms or 100 gigaohms, a complete pinch-off state occurred. In contrast, when the resistances of the gate resistor 3 were 10 gigaohms and 30 gigaohms, the pyroelectric devices continued producing a signal, although the output was not so stable as in the case where the resistance of the gate resistor 3 was 5 gigaohms.

In the circuit configuration of the present embodiment, when the resistance of the gate resistor 3 is large and when the temperature decreases relatively rapidly, electric charges accumulate on the pyroelectric member 1 temporarily, saturating FET 2. Consequently, a nonsignal output state occurs. This means that if the ambient temperature changes rapidly, the pyroelectric device may not produce an output signal. That is, if a device having the possibility to generate a pinch-off state is used in a flame sensor or an intrusion detector, when the ambient temperature changes rapidly due to, for example, a storm or adhesion of moisture, the device may not output an accurate fire signal or a signal for preventing a crime.

Thus, a reduction in the resistance of the gate resistor 3 is effective not only to improve the frequency characteristics but also to cope with pinch-off or to stabilize a signal.

I claim:

1. A pyroelectric device for a fire detection, comprising:
   a pyroelectric member made of polyvinylidene fluoride for detecting infrared radiation;
   a transistor having a gate electrode connected to one terminal of said pyroelectric member;

a drain terminal connected to a drain electrode of said transistor;

a source terminal connected to a source electrode of said transistor;

a grounding terminal connected to another terminal of said pyroelectric member; and a gate resistor connected between the terminals of said pyroelectric member, said gate resistor having a resistance of about 10 gigaohms.

2. A pyroelectric device according to claim 1 wherein said transistor is a field-effect transistor.

3. A pyroelectric device according to claim 1 further comprising a voltage-stabilizing capacitor connected to said drain terminal and said grounding terminal and having a capacitance of about 10 pF.

4. A pyroelectric device according to claim 1 further comprising a noise-cutting capacitor connected between said source terminal and said grounding terminal and having a capacitance of about 10 pF.

* * * * *